(12) United States Patent
Yang et al.

(10) Patent No.: US 11,703,655 B2
(45) Date of Patent: Jul. 18, 2023

(54) LENS ASSEMBLY

(71) Applicant: Samsung Electro-Mechanics Co., Ltd., Suwon-si (KR)

(72) Inventors: Dong Shin Yang, Suwon-si (KR); In Gun Kim, Suwon-si (KR); Ju Sung Park, Suwon-si (KR); Sot Eum Seo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 244 days.

(21) Appl. No.: 17/221,113

(22) Filed: Apr. 2, 2021

(65) Prior Publication Data
US 2021/0223498 A1 Jul. 22, 2021

Related U.S. Application Data

(63) Continuation of application No. 16/181,822, filed on Nov. 6, 2018, now Pat. No. 10,996,420.

(30) Foreign Application Priority Data

May 11, 2018 (KR) ........................ 10-2018-0054150

(51) Int. Cl.
*G02B 7/02* (2021.01)

(52) U.S. Cl.
CPC ..................... *G02B 7/02* (2013.01)

(58) Field of Classification Search
CPC ...... G02B 7/02; G02B 1/041; G02B 13/0045; G02B 13/0055; G02B 5/005; G02B 7/021;
(Continued)

(56) References Cited

U.S. PATENT DOCUMENTS

| 5,640,280 A | 6/1997 | Lee |
| 6,510,121 B2* | 1/2003 | Ijima ................... G11B 7/0933 359/813 |

(Continued)

FOREIGN PATENT DOCUMENTS

| CN | 204359995 U | 5/2015 |
| CN | 209167633 U | 7/2019 |

(Continued)

OTHER PUBLICATIONS

Chinese Office Action dated Aug. 11, 2021 issued in counterpart Chinese Patent Application No. 201910129686.7 (3 pages in English and 5 pages in Chinese).

(Continued)

*Primary Examiner* — Collin X Beatty
(74) *Attorney, Agent, or Firm* — NSIP Law

(57) ABSTRACT

A lens assembly includes a lens including an optical portion to refract light and a flange portion extended along a periphery of at least a portion of the optical portion, and a lens barrel to accommodate the lens. The flange portion has a non-circular shape and includes a first di-cut portion on a first side surface of the flange portion, a second di-cut portion on a second side surface of the flange portion, and arc portions connecting the first di-cut portion and the second di-cut portion. A first distance between the first di-cut portion and an optical axis of the lens and a second distance between the second di-cut portion and the optical axis of the lens are smaller than a distance between respective opposite ends of the arc portions and the optical axis.

12 Claims, 7 Drawing Sheets

(58) Field of Classification Search
CPC .......... G02B 13/002; G02B 1/04; G02B 1/10; G02B 1/11; G02B 1/14; G02B 27/646; G02B 5/003; G02B 7/022; G02B 9/04; G02B 9/60; G11B 7/0933; G11B 7/0935; G11B 7/093; G11B 2007/0006; G11B 7/0932; G11B 7/0941; G11B 7/0956; G11B 7/1376; G11B 7/13922; G11B 7/22; G03B 17/00; G03B 5/02; G03B 5/04
USPC .......................................................... 359/819
See application file for complete search history.

(56) References Cited

U.S. PATENT DOCUMENTS

| 6,791,763 | B2 | 9/2004 | Hattori et al. |
| 7,458,087 | B2 | 11/2008 | Song et al. |
| 8,442,393 | B2 | 5/2013 | Bang et al. |
| 9,341,813 | B1 | 5/2016 | Lin et al. |
| 10,436,954 | B2 | 10/2019 | Shih et al. |
| 10,444,464 | B2 | 10/2019 | Lin et al. |
| 10,451,852 | B2 | 10/2019 | Chou et al. |
| 2002/0114085 | A1 | 8/2002 | Hattori et al. |
| 2007/0188620 | A1 | 8/2007 | Takahashi |
| 2013/0287383 | A1* | 10/2013 | Haruguchi ............... G03B 3/10 396/144 |
| 2016/0139359 | A1 | 5/2016 | Lin et al. |
| 2016/0231526 | A1* | 8/2016 | Lin ........................ G02B 7/022 |
| 2019/0179103 | A1 | 6/2019 | Yang et al. |

FOREIGN PATENT DOCUMENTS

| JP | 2002-243915 A | 8/2002 |
| JP | 2003-50309 A | 2/2003 |
| JP | 2013-228610 A | 11/2013 |
| JP | 2014-69470 A | 4/2014 |

OTHER PUBLICATIONS

Chinese Office Action dated Jan. 13, 2021 in counterpart Chinese Patent Application No. 201910129686.7 (7 pages in English)(7 pages in Chinese).

* cited by examiner

LENS ASSEMBLY

CROSS-REFERENCE TO RELATED APPLICATIONS

This is a continuation of U.S. application Ser. No. 16/181,822, filed on Nov. 6, 2018, which in turn claims the benefit under 35 USC 119(a) to Korean Patent Application No. 10-2018-0054150 filed on May 11, 2018 in the Korean Intellectual Property Office, the entire disclosures of which are incorporated herein by reference for all purposes.

BACKGROUND

1. Field

The following description relates to a lens assembly.

2. Description of Related Art

A camera module is used in a portable electronic device such as a smartphone, and in recent years, miniaturization of the camera module mounted on the portable electronic device has been required in accordance with demand for miniaturization of portable electronic devices. In addition, it is necessary to improve performance of camera modules separately from the necessity of miniaturization of such camera modules. Therefore, research into reducing the size of camera modules, while maintaining the performance of the camera modules, is required.

In general, since an image sensor of the camera module has a rectangular shape and a lens that refracts light is circular, not all light refracted by the lens is incident on the image sensor. Therefore, a method of reducing a size of the lens by removing unnecessary portions from the lens to thereby reduce the size of the camera module may be considered.

However, in the case of merely removing a part of the lens, an unexpected interference phenomenon between two components may occur when the lens is attached to a lens barrel, which may cause tilting during assembly, and a resolution of the camera module may be lowered by the tilting.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens including an optical portion to refract light and a flange portion extended along a periphery of at least a portion of the optical portion, and a lens barrel to accommodate the lens. The flange portion has a non-circular shape and includes a first di-cut portion on a first side surface of the flange portion, a second di-cut portion on a second side surface of the flange portion, and arc portions connecting the first di-cut portion and the second di-cut portion. A first distance between the first di-cut portion and an optical axis of the lens and a second distance between the second di-cut portion and the optical axis of the lens are smaller than a distance between respective opposite ends of the arc portions and the optical axis.

The first di-cut portion and the second di-cut portion may not be in contact with the lens barrel, and the arc portions may be in contact with the lens barrel.

When a straight line passing through the optical axis of the lens and extending to be parallel to the first di-cut portion and the second di-cut portion is a first reference line, a shortest distance between the first reference line and any one of the first di-cut portion and the second di-cut portion may be smaller than a maximum radius of the optical portion.

When a straight line passing through the optical axis of the lens and extending to be parallel to the first di-cut portion and the second di-cut portion is a first reference line, a shortest distance between the first reference line and any one of the first di-cut portion and the second di-cut portion may be greater than or equal to a maximum radius of the optical portion.

The optical portion may have a non-circular shape, the first di-cut portion may extend along the first side surface of the flange portion and a first side surface of the optical portion, and the second di-cut portion may extend along the second side surface of the flange portion and a second side surface of the optical portion.

The first di-cut portion and the second di-cut portion may each include a plane.

The lens assemble may include a second lens to be accommodated in the lens barrel, and the second lens may have a different shape than the lens.

The lens may be disposed closer to an image sensor than the second lens.

In another general aspect, a lens assemble includes a lens including an optical portion to refract light and a flange portion extended along a periphery of at least a portion of the optical portion, and a lens barrel to accommodate the lens. The flange portion has a non-circular shape and includes a first di-cut portion on a first side surface of the flange portion, a second di-cut portion on a second side surface of the flange portion, arc portions connecting the first di-cut portion and the second di-cut portion, first evasion portions between the first di-cut portion and the arc portions, and second evasion portions between the second di-cut portion and the arc portions. A distance between each of the evasion portions and an optical axis of the lens is smaller than a distance between respective opposite ends of the arc portions and the optical axis.

When a straight line passing through the optical axis of the lens and extending to be parallel to the first di-cut portion and the second di-cut portion is a first reference line, a shortest distance between the first reference line and any one of the first di-cut portion and the second di-cut portion may be smaller than or equal to a shortest distance between the first reference line and an end of one side of the arc portions.

When a straight line passing through the optical axis of the lens and extending to be parallel to the first di-cut portion and the second di-cut portion is a first reference line, a shortest distance between the first reference line and any one of the first di-cut portion and the second di-cut portion may be greater than a shortest distance between the first reference line and each of the evasion portions.

In another general aspect, a lens assembly includes a lens and a lens barrel to accommodate the lens. The lens includes a first di-cut portion on a first side surface of the lens, a second di-cut portion on a second side surface of the lens opposing the first side surface, a first arc portion connecting first ends of the first di-cut portion and the second di-cut portion, and a second arc portion connecting second ends of the first di-cut portion and the second di-cut portion. When a straight line passing through the optical axis of the lens and extending to be parallel to the first di-cut portion and the second di-cut portion is a first reference line, a shortest distance between the first reference line and any one of the first di-cut portion and the second di-cut portion is smaller than a shortest distance between the first reference line and an end of one side of each of the first arc portion and the second arc portion.

The lens barrel may include a third di-cut portion corresponding to the first di-cut portion, a fourth di-cut portion corresponding to the second di-cut portion, a third arc portion corresponding to the first arc portion, and a fourth arc portion corresponding to the second arc portion.

The third di-cut portion may not make contact with the first di-cut portion, the fourth di-cut portion may not make contact with the second di-cut portion, the third arc portion may make contact with the first arc portion, and the fourth arc portion may make contact with the second arc portion.

The lens assembly may be included in a camera module, and the camera module may include a housing to accommodate the lens assembly and an image sensor module to convert light incident through the lens assembly into an electrical signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
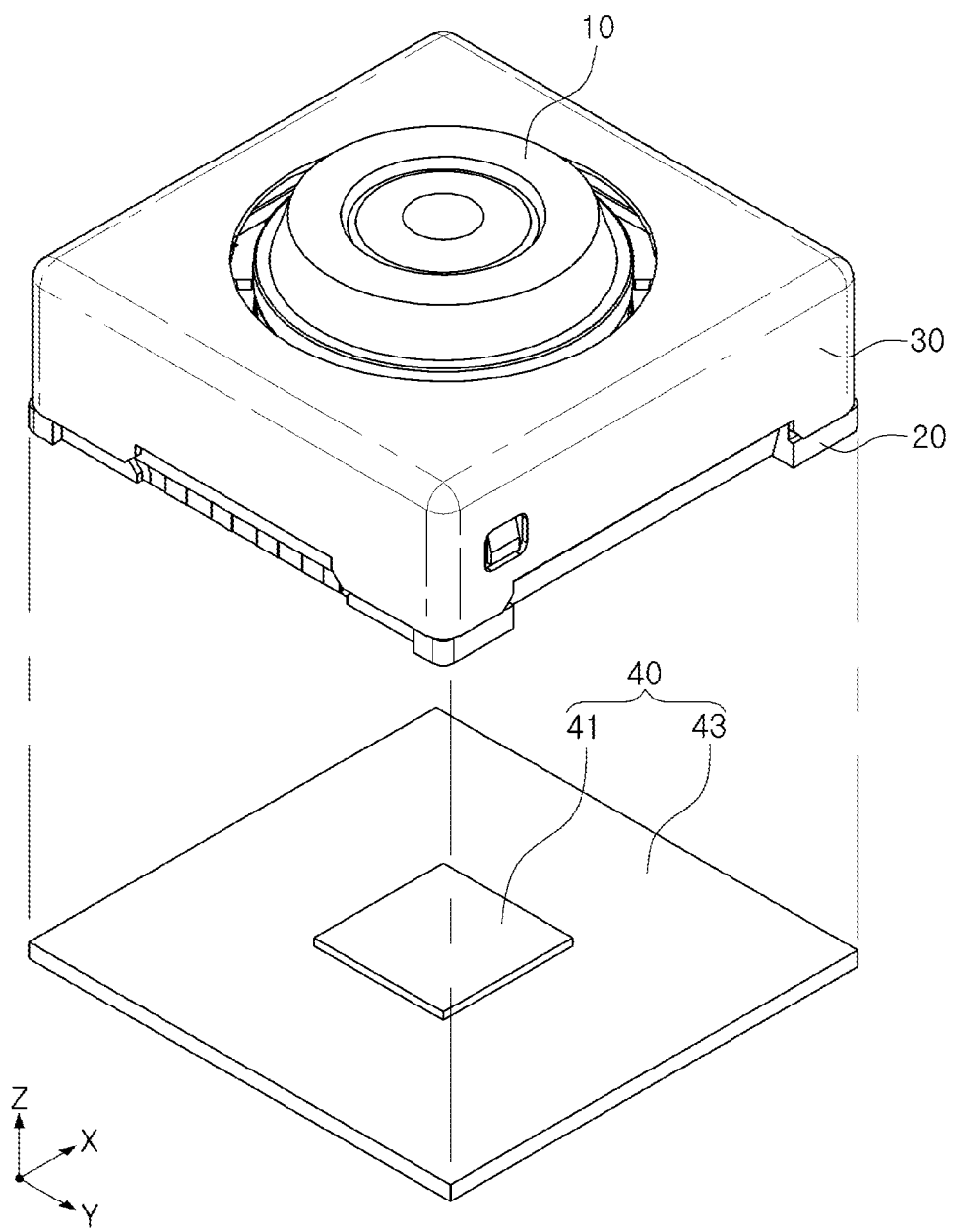
FIG. 1 is a perspective view illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective view illustrating a camera module according to an example.

Referring to FIG. 1, a camera module may include a lens assembly 10, a housing 20 accommodating the lens assembly 10, a case 30 coupled to the housing 20, and an image sensor module 40 converting light incident through the lens assembly 10 into an electrical signal.

Figure 2:
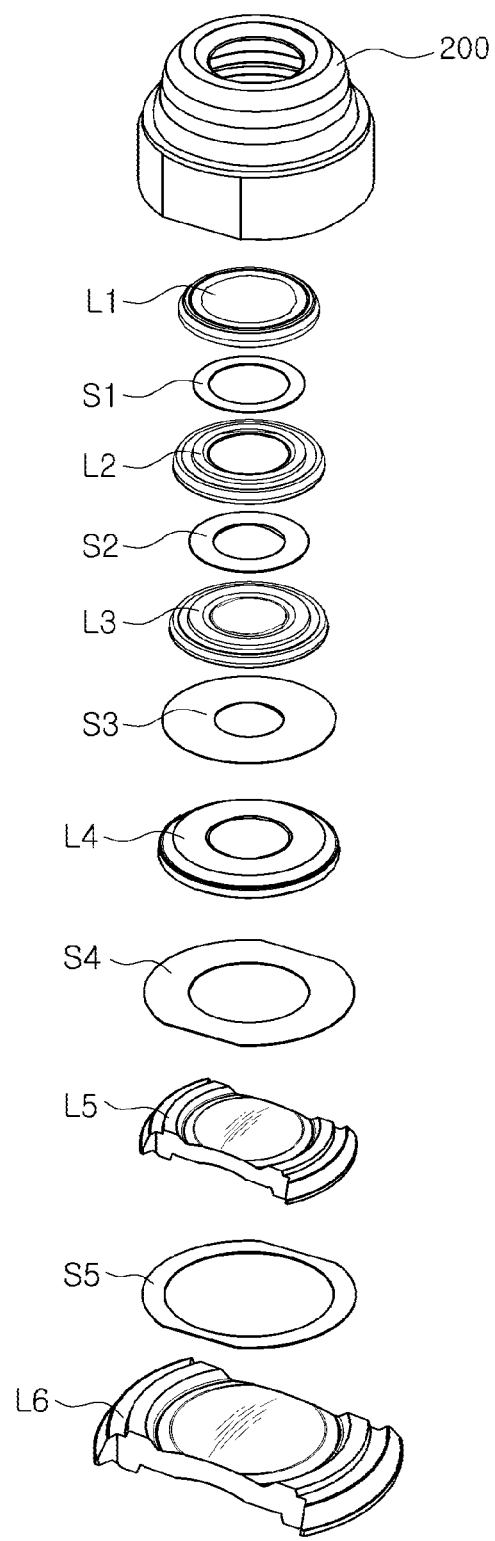
FIG. 2 is an exploded perspective view illustrating a lens assembly according to an example.

As seen in FIG. 2, the lens assembly 10 may include a lens barrel 200 and at least one lens.

At least one lens may be accommodated in the lens barrel 200. At least one lens may be arranged from an object side to an image side (an image sensor 41 side) along an optical axis direction.

In a case in which a plurality of lenses is provided, each lens may have optical characteristics such as the same or different refractive power or the like.

The lens assembly 10 may be accommodated in the housing 20.

As an example, the housing 20 may have a shape of which the top and the bottom are opened, and the lens barrel 10 may be accommodated in an internal space of the housing 20.

The image sensor module 40 may be disposed on the bottom of the housing 20.

An actuator that moves the lens assembly 10 for focusing and/or image stabilization may be disposed on the housing 20.

The lens assembly 10 may be moved in the optical axis direction (Z-axis direction) by the actuator to perform the focusing, and may be moved in a direction (X-axis direction and/or Y-axis direction) perpendicular to the optical axis to perform the image stabilization at the time of capturing the image.

The case 30 may be coupled to the housing 20, and may serve to protect internal components of the camera module.

The case 30 may serve to shield electromagnetic waves.

As an example, the case 30 may shield electromagnetic waves generated from the camera module so that the electromagnetic waves do not have an influence on other electronic components in the portable electronic device.

Since several electronic components, as well as the camera module, are mounted in the portable electronic device, the case 30 may shield electromagnetic waves generated from these electronic components so that the electromagnetic waves do not have an influence on the camera module.

The case 30 may be formed of a metal and be grounded to a ground pad provided on a printed circuit board 43, resulting in shielding the electromagnetic waves.

The image sensor module 40 may be a device converting light incident through the lens assembly 10 into an electrical signal.

As an example, the image sensor module 40 may include the image sensor 41 and the printed circuit board 43 connected to the image sensor 41, and may further include an infrared filter.

The infrared filter may cut off light in an infrared region of the light incident through the lens assembly 10.

The image sensor 41 may convert the light incident through the lens assembly 10 into an electrical signal. As an example, the image sensor 41 may be a charge coupled device (CCD) or a complementary metal oxide semiconductor (CMOS).

The electrical signal converted by the image sensor 41 may be output as an image through a display unit of a portable electronic device.

The image sensor 41 may be fixed to the printed circuit board 43, and may be electrically connected to the printed circuit board 43 by wire bonding.

FIG. 2 is an exploded perspective view illustrating a lens assembly according to an example.

Referring to FIG. 2, the lens assembly 10 may include the lens barrel 200 and a plurality of lenses.

The plurality of lenses may include a first lens L1, a second lens L2, a third lens L3, a fourth lens L4, a fifth lens L5, and a sixth lens L6 that are sequentially disposed from an object side to an image side (an image sensor 41 side). However, the plurality of lenses is not limited to six lenses, but may include five or less lenses, or seven or more lenses.

Spacers may be provided between the lenses that are adjacent to each other. The spacers may maintain intervals between the lenses and may cut off unnecessary light. The spacers may include a first spacer S1, a second spacer S2, a third spacer S3, a fourth spacer S4, and a fifth spacer S5 that are arranged from the object side to the image side (the image sensor 41 side).

An incident hole through which light passes may be formed in a central portion of each of the spacers. Light reflected by a subject may be refracted by the plurality of lenses and may be incident on the image sensor 41 through the incident holes of the spacers.

The spacers may be formed of a metal, and a light absorbing layer may be provided on an outer surface of the spacers to prevent unwanted light from being incident on the image sensor 41. The light absorbing layer may be a black film or black iron oxide.

Among the plurality of lenses, two lenses L5 and L6 disposed closer to the image sensor 41 side may be formed in a non-circular shape, and four lenses L1, L2, L3, and L4 disposed closer to the object side may be formed in a generally circular shape.

The shape of the two lenses L5 and L6 disposed closer to the image sensor 41 side and the shape of the four lenses L1, L2, L3, and L4 disposed closer to the object side may be different from each other. However, the lenses having the non-circular shape are not limited to only the two lenses L5 and L6.

Portions of the lens barrel 200 corresponding to portions at which the two lenses (for example, the fifth lens L5 and the sixth lens L6) disposed closer to the image side are disposed may have the non-circular shape.

The spacers S4 and S5 that are in contact with at least one of the fifth lens L5 and the sixth lens L6 among the spacers may be formed in a non-circular shape.

The lens assembly 10 used in the portable electronic device may generally have a short through-the-lens (TTL) for miniaturization. Here, TTL is a distance from an object side surface of the first lens L1 to an imaging surface of the image sensor 41.

Instead of shortening the TTL, a diameter of the plurality of lenses becomes larger as the plurality of lenses are closer to the image side in order to secure the optical performance.

In the lens assembly 10, an overall size of the lens assembly 10 may be reduced by forming the two lenses (for example, the fifth lens L5 and the sixth lens L6) disposed closer to the image side in a non-circular shape. As a result, the camera module may be miniaturized.

Figure 3:
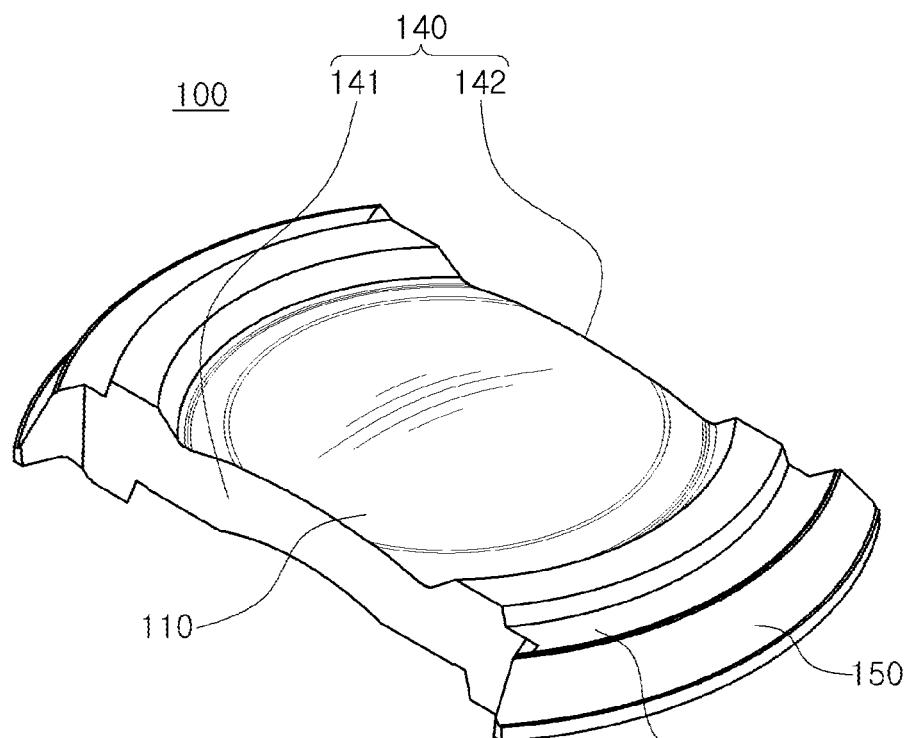
FIG. 3 is a perspective view for describing a lens of the lens assembly according to an example.

FIG. 3 is a perspective view for describing a lens of the lens assembly according to an example.

The plurality of lenses of the lens assembly 10 may include non-circular lenses. The number of non-circular lenses may be two or more, but one lens will be described below for convenience of explanation.

Referring to FIG. 3, a lens 100 may include an optical portion 110 and a flange portion 130 formed at a periphery of at least a portion of the optical portion 110.

The optical portion 110 may be a portion in which optical performance of the lens 100 is exhibited. As an example, light reflected by a subject may be refracted while passing through the optical portion 110.

The optical portion 110 may have positive or negative refractive power, may have a spherical surface shape or an aspherical surface shape, and may have a concave, convex, or meniscus shape in a paraxial region (a portion adjacent to an optical axis).

The flange portion 130 may be a portion that fixes the lens 100 to another component, for example, the lens barrel 200 or another lens.

The flange portion 130 may be extended from a periphery of at least a portion of the optical portion 110 and may be formed integrally with the optical portion 110.

The lens 100 may be formed of plastic and may be injection-molded through a molding.

In general, when the lens is injected-molded through the molding, a gate portion may be formed in a portion corresponding to a passage into which a resin material is introduced. In order to remove the gate portion, a portion of a side surface of the flange portion 130 of the lens may be cut in the optical axis direction.

In this case, when being viewed in the optical axis direction, the optical portion 110 of the lens may be generally formed in a circular shape, but the flange portion 130 may have a 'D' shape in which a portion thereof is removed. Hereinafter, a portion having the 'D' shape will be referred to as a di-cut portion. For reference, the meaning of 'cut' in the di-cut portion is not limited to cutting or removal.

The lens 100 may include di-cut portions 140 and arc portions 150.

The di-cut portions 140 may be plane portions formed on the optical portion 110 and the flange portion 130 and the arc portions 150 may be portions formed in an arc shape to connect the di-cut portions 140 to each other.

The term 'plane' is not limited to only a perfect plane, but may include tolerance at the time of manufacturing. The term 'arc' is not limited to only a perfect arc, but may be include tolerance at the time of manufacturing.

The di-cut portions 140 may be formed on a side surface of the optical portion 110 and a side surface of the flange portion 130. Therefore, the optical portion 110 and the flange portion 130 may have a non-circular shape. As an example, the di-cut portions 140 may be formed at positions symmetrical to each other with respect to an optical axis O. The term 'symmetrical' is not limited to being only perfectly symmetrical to each other, but may include tolerance at the time of manufacturing.

The di-cut portions 140 may include a first di-cut portion 141 and a second di-cut portion 142 formed to be symmetrical to each other on the side surface of the optical portion 110 and the side surface of the flange portion 130 with respect to the optical axis O.

The first di-cut portion 141 may extend along one side surface of the optical portion 110 and one side surface of the flange portion 130, and the second di-cut portion 142 may extend along the other side surface (a surface opposing one side surface) of the optical portion 110 and the other side surface (a surface opposing one side surface) of the flange portion 130.

The di-cut portions 140 may also be formed only on the side surface of the flange portion 130. The optical portion 110 may be formed in a circular shape.

The first di-cut portion 141 and the second di-cut portion 142 may be manufactured to have a 'D' shape at the time of injection. That is, unlike cutting the portion of the side surface of the flange portion 130 of the lens 100 in the direction of the optical axis after injection to remove the gate portion, the lens 100 may be manufactured so that the side surface of the optical portion 110 and the side surface of the flange portion 130 have the 'D' shape at the time of injection.

Since the first di-cut portion 141 and the second di-cut portion 142 are manufactured to have the 'D' shape at the time of injection, a length of a straight line passing through the optical axis O of the lens 100 and connecting the first di-cut portion 141 and the second di-cut portion 142 to each other may be smaller than a length of a straight line passing through the optical axis O of the lens 100 and connecting the arc portions 150 to each other.

The lens 100 includes the first di-cut portion 141 and the second di-cut portion 142, which are symmetrical to each other with respect to the optical axis O, such that the lens 100 may be miniaturized while securing the optical performance of the lens 100, and the miniaturization and performance improvement of the camera module may also be implemented.

The first di-cut portion 141 and the second di-cut portion 142 are not formed by removing the portion of the lens 100 after the injection molding unlike a general injection lens, but may be formed to have the 'D' shape at the time of injection.

In the case of the general injection lens, since the portion of the lens is removed after injection molding, the lens may be deformed by force applied to the lens during the process. In a case in which the lens is deformed, the optical performance of the lens may be inevitably changed.

In a case in which di-cut portions are formed to be symmetrical to each other with respect to the optical axis by removing the portion of the lens after injection molding the lens, the lens may be miniaturized, but the performance of the lens may be deteriorated.

Since the first di-cut portion 141 and the second di-cut portion 142 are formed on the optical portion 110 and the flange portion 130 of the lens 100 at the time of injection, the lens 100 may be miniaturized and the performance of the lens 100 may be secured.

Figure 4:
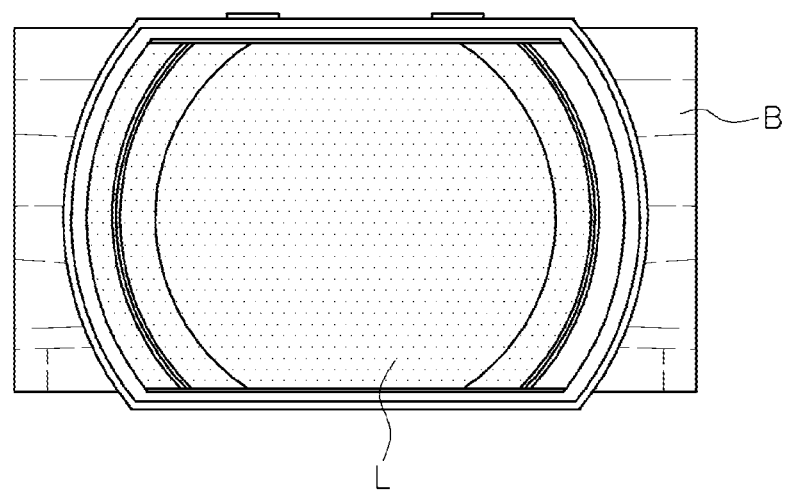
FIG. 4 is a plan view illustrating a general non-circular lens and a lens barrel coupled to each other.
Figure 5:
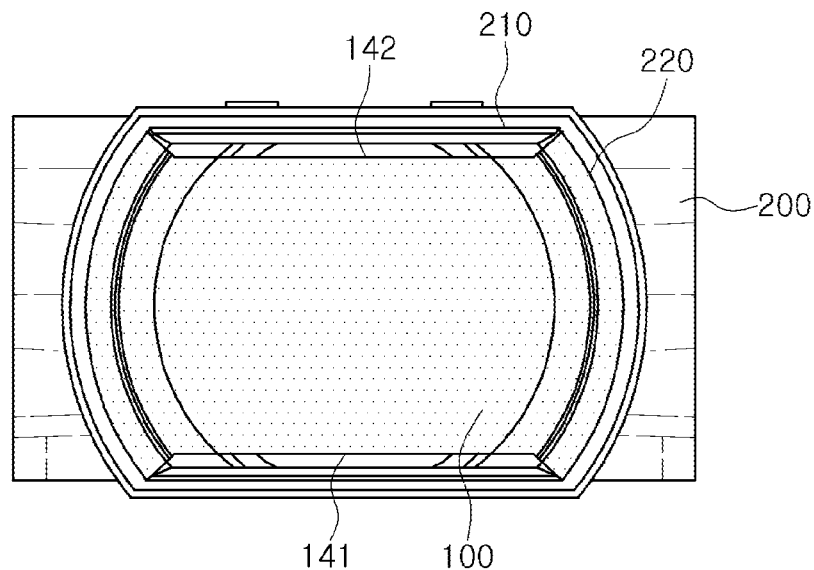
FIG. 5 is a plan view illustrating a lens of a lens assembly and a lens barrel according to an example coupled to each other.

FIG. 4 is a plan view illustrating a general non-circular lens and a lens barrel coupled to each other and FIG. 5 is a plan view illustrating a lens of a lens assembly and a lens barrel according to an example coupled to each other.

Referring to FIG. 4, the di-cut portions may be formed on the side surfaces of the lens L, and an inner surface and an outer surface of the lens barrel B corresponding to the di-cut portions of the lens L may be formed in a plane.

In this case, the lens barrel B and the lens L may be configured so that two surfaces are in contact with each other. For example, the arc portions of the lens L may be configured to be in contact with the lens barrel B, and the di-cut portions of the lens L may be configured to not be in contact with the lens barrel B.

As illustrated in FIG. 4, the di-cut portions of the lens L may be disposed to be spaced apart from the inner surface of the lens barrel B in a direction perpendicular to the optical axis, and the arc portions of the lens L may be disposed to be in contact with the inner surface of the lens barrel B.

However, even though the di-cut portions of the lens L are configured to not be in contact with the inner surface of the lens barrel B, intervals between the di-cut portions of the lens L and the inner surface of the lens barrel B need to be very narrow for miniaturization of the camera module.

When the lens L and the lens barrel B are manufactured, design errors and/or manufacturing tolerances may occur. Accordingly, at least portions of the di-cut portions of the lens L may be unintentionally in contact with the lens barrel B. In this case, there is a possibility that tilting, in which the lens L is tilted, occurs during a process of inserting the lens L into the lens barrel B. A resolution of the camera module may be lowered by the tilting.

However, as illustrated in FIG. 5, the lens assembly according to an example may prevent an occurrence of the tilting when the lens barrel 200 and the lens are assembled.

Referring to FIG. 5, an inner surface of the lens barrel 200 may be substantially similar to the shape of the lens 100.

The lens barrel 200 may include di-cut portions 210 and arc portions 220 formed on the inner surface of the lens barrel 200.

The di-cut portions 210 of the lens barrel 200 may be formed at positions corresponding to the di-cut portions 140 of the lens 100.

The di-cut portions 210 of the lens barrel 200 may also refer to plane portions formed on the inner surface of the lens barrel 200. The term 'plane' is not limited to only a perfect plane, but may include tolerance at the time of manufacturing.

The arc portions 220 of the lens barrel 200 may be formed at positions corresponding to the arc portions 150 of the lens 100.

The arc portions 220 of the lens barrel 200 may also refer to portions formed in an arc shape on the inner surface of the lens barrel 200. The term 'arc' is not limited to only a perfect arc, but may include tolerance at the time of manufacturing.

The di-cut portions 140 of the lens 100 may be configured to not be in contact with the lens barrel 200, and the arc portions 150 of the lens 100 may be configured to be in contact with the lens barrel 200. As an example, the first di-cut portion 141 and the second di-cut portion 142 of the lens 100 may be configured to be spaced apart from the di-cut portions 210 of the lens barrel 200 in a direction perpendicular to the optical axis, and the arc portions 150 of the lens 100 may be disposed to be in contact with the arc portions 220 of the lens barrel 200.

The di-cut portions 140 of the lens 100 may be positioned inwardly from opposite ends 151 and 152 (FIG. 6) of the arc portions 150.

The intervals between the first di-cut portion 141 and the second di-cut portion 142, and the inner surface of the lens barrel 200 may be sufficiently secured. As a result, the first di-cut portion 141 and the second di-cut portion 142, and the inner surface of the lens barrel 200 may be always spaced apart from each other without being affected by design errors and/or manufacturing tolerances.

Figure 6:
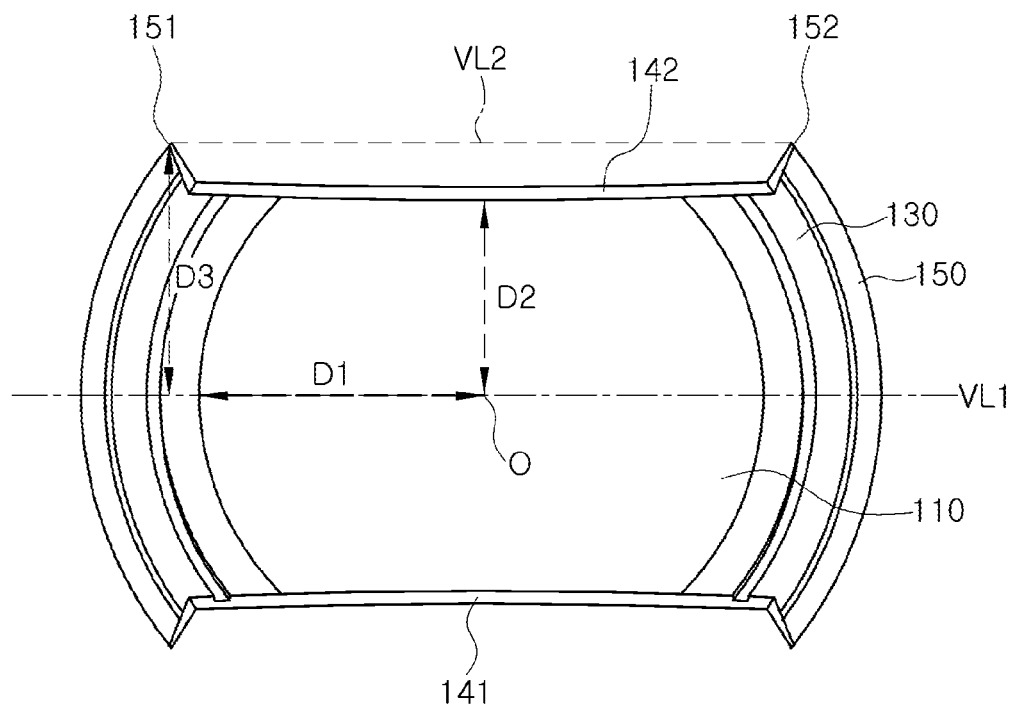
FIG. 6 is a plan view illustrating a lens of a lens assembly according to an example.

FIG. 6 is a plan view illustrating a lens of a lens assembly according to an example.

Referring to FIG. 6, the lens 100 may include the optical portion 110 and the flange portion 130 formed at a periphery of at least a portion of the optical portion 110.

Here, the optical portion 110 and the flange portion 130 may have a non-circular shape.

The first di-cut portion 141 may be formed on one side surface of the optical portion 110 and one side surface of the flange portion 130, and the second di-cut portion 142 may be formed on the other side surface of the optical portion 110 and the other side surface of the flange portion 130. One side surface of the optical portion 110 and the other side surface thereof may be surfaces opposing each other, and one side surface of the flange portion 130 and the other side surface thereof may also be surfaces opposing each other.

The arc portions 150 connecting the first di-cut portion 141 and the second di-cut portion 142 to each other may be formed on the flange portion 130.

The first di-cut portion 141 and the second di-cut portion 142 may be positioned inwardly from opposite ends 151 and 152 of the arc portions 150. The first di-cut portion 141 and the second di-cut portion 142 may be positioned to be closer to the optical axis O than the opposite ends 151 and 152 of the arc portions 150. The first di-cut portion 141 and the second di-cut portion 142 may have shapes depressed inwardly toward the optical axis O from the side surface of the optical portion 110 and the side surface of the flange portion 130.

The first di-cut portion 141 and the second di-cut portion 142 are positioned inwardly from opposite ends 151 and 152 of the arc portions 150, such that sufficient spaces between the di-cut portions 140 of the lens 100 and the inner surface of the lens barrel 200 may be secured. As a result, the di-cut portions 140 of the lens 100 and the lens barrel 200 may be always spaced apart from each other without being affected by design errors and/or manufacturing tolerances.

A shortest distance D2 between a straight line VL1 (hereinafter, referred to as a first reference line) passing through the optical axis O of the lens 100 and extending to be parallel to the di-cut portions 140 and the di-cut portions 140 (the second di-cut portion 142 in FIG. 6) may be smaller than a shortest distance D3 between the first reference line VL1 and an end 151 of one side of the arc portions 150.

The shortest distance D2 between the first reference line VL1 and the di-cut portions 140 (the second di-cut portion 142 in FIG. 6) may be smaller than a maximum radius D1 of the optical portion 110 of the lens 100.

The di-cut portions 140 may be positioned to be closer to the optical axis O than a straight line VL2 (hereinafter, referred to as a second reference line) connecting the opposite ends 151 and 152 of a pair of arc portions 150 opposing each other. The second reference line VL2 may be a line extending to be parallel to the first reference line VL1.

Figure 7:
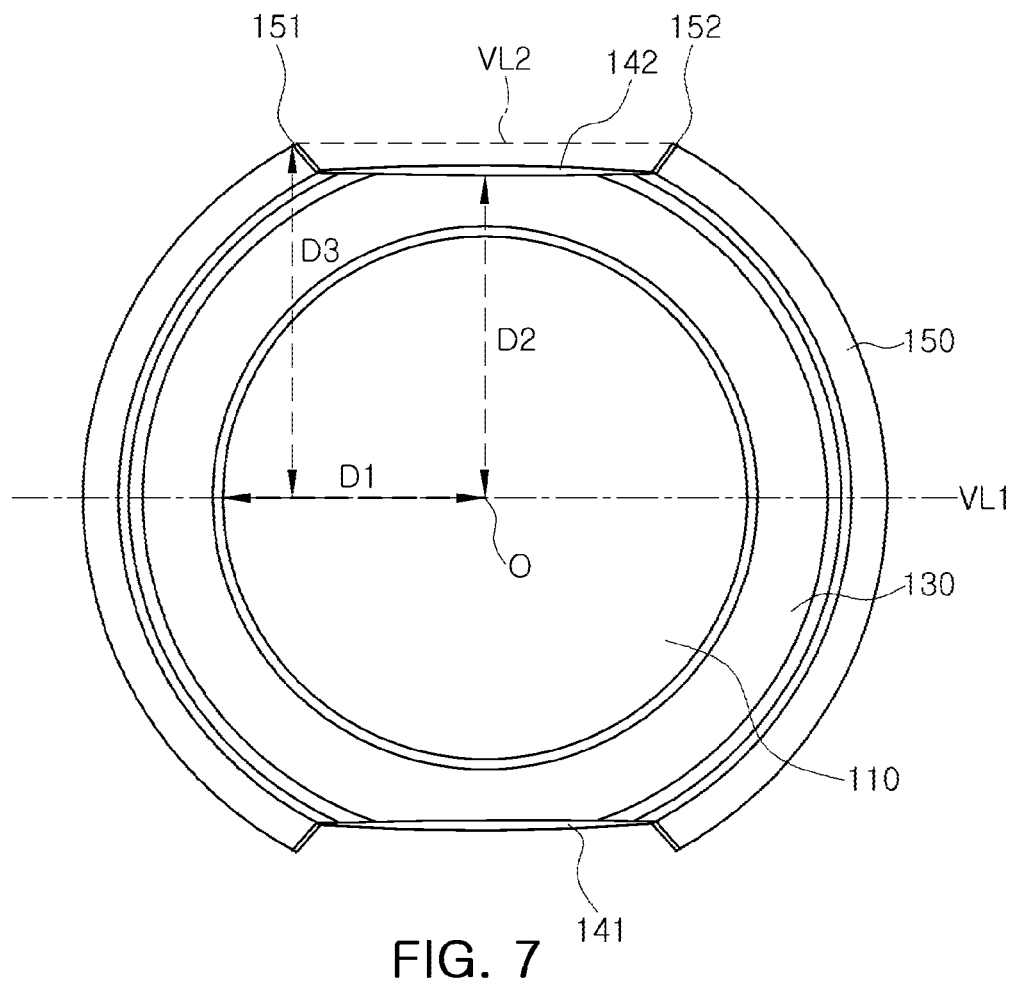
FIGS. 7, 8, and 9 are plan views illustrating a lens of a lens assembly according to various examples.

FIG. 7 is a plan view illustrating a lens of a lens assembly according to an example.

Referring to FIG. 7, the first di-cut portion 141 and the second di-cut portion 142 may be formed on the flange portion 130 of the lens 100.

For example, the first di-cut portion 141 may be formed on one side surface of the flange portion 130, and the second di-cut portion 142 may be formed on the other side surface of the flange portion 130. One side surface of the flange portion 130 and the other side surface thereof may be surfaces opposing each other. The arc portions 150 connecting the first di-cut portion 141 and the second di-cut portion 142 to each other may be formed on the flange portion 130.

The shortest distance D2 between the first reference line VL1 and the di-cut portions 140 (the second di-cut portion 142 in FIG. 7) may be smaller than the shortest distance D3 between the first reference line VL1 and the end 151 of one side of the arc portions 150.

The shortest distance D2 between the first reference line VL1 and the di-cut portions 140 (the second di-cut portion 142 in FIG. 7) may be greater than or equal to the maximum radius D1 of the optical portion 110 of the lens 100. Although D2 is illustrated to be greater than D1 in FIG. 7, D2 may be equal to D1.

The di-cut portions 140 may be positioned to be closer to the optical axis O than the second reference line VL2, such that the distance D3 is greater than the distance D2.

Figure 8:
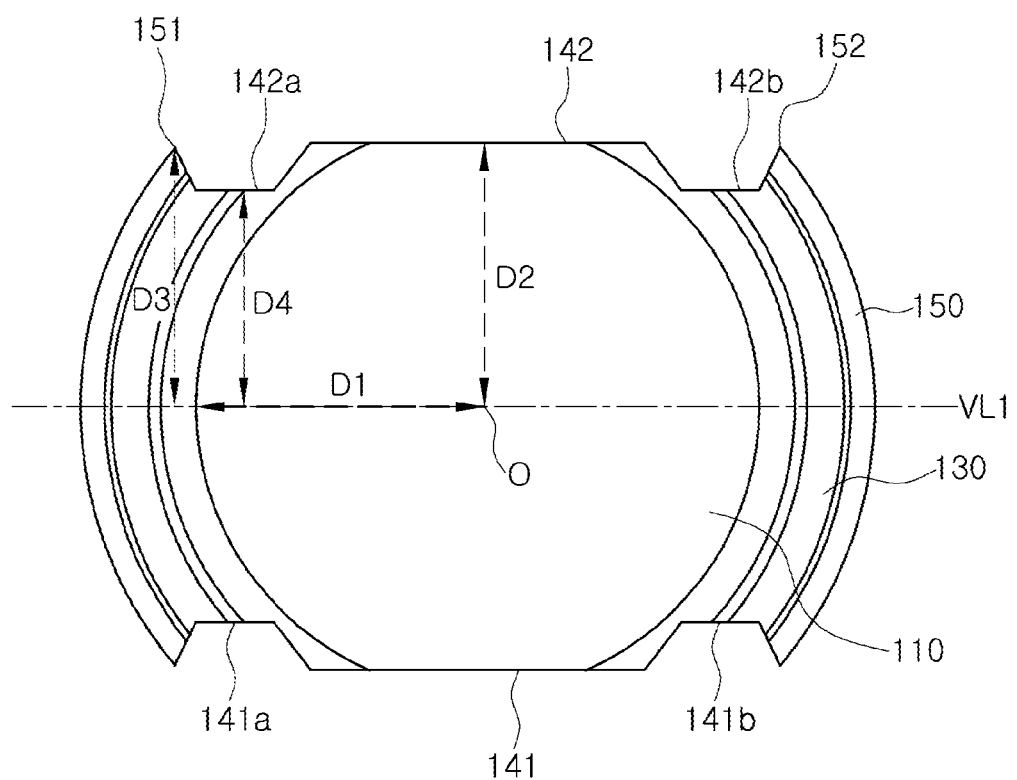

FIG. 8 is a plan view illustrating a lens of a lens assembly according to an example.

Referring to FIG. 8, the first di-cut portion 141 may be formed on one side surface of the optical portion 110 and one side surface of the flange portion 130, and the second di-cut portion 142 may be formed on the other side surface of the optical portion 110 and the other side surface of the flange portion 130. One side surface of the optical portion 110 and the other side surface thereof may be surfaces opposing each other, and one side surface of the flange portion 130 and the other side surface thereof may also be surfaces opposing each other.

The arc portions 150 connecting the first di-cut portion 141 and the second di-cut portion 142 to each other may be formed on the flange portion 130.

The shortest distance D2 between the first reference line VL1 and the di-cut portions 140 (the second di-cut portion 142 in FIG. 8) may be smaller than or equal to the shortest distance D3 between the first reference line VL1 and the end 151 of one side of the arc portions 150.

The shortest distance D2 between the first reference line VL1 and the di-cut portions 140 (the second di-cut portion 142 in FIG. 8) may be smaller than a maximum radius D1 of the optical portion 110 of the lens 100.

Evasion portions may be formed on the flange portion 130. For example, a 1-1-th evasion portion 141a and a 1-2-th evasion portion 141b may be formed between the first di-cut portion 141 and the arc portions 150, and a 2-1-th evasion portion 142a and a 2-2-th evasion portion 142b may be formed between the second di-cut portion 142 and the arc portions 150.

The 1-1-th evasion portion 141a, the 1-2-th evasion portion 141b, the 2-1-th evasion portion 142a, and the 2-2-th evasion portion 142b may have a shape that is depressed inwardly from the flange portion 130.

The 1-1-th evasion portion 141a, the 1-2-th evasion portion 141b, the 2-1-th evasion portion 142a, and the 2-2-th evasion portion 142b may be positioned to be closer to the optical axis O than the opposite ends 151 and 152 of the arc portions 150.

The shortest distance D2 between the first reference line VL1 and the di-cut portions 140 (the second di-cut portion 142 in FIG. 8) may be greater than the shortest distance D4 between the first reference line VL1 and the evasion portions (the 2-1-th evasion portion 142a in FIG. 8).

Figure 9:
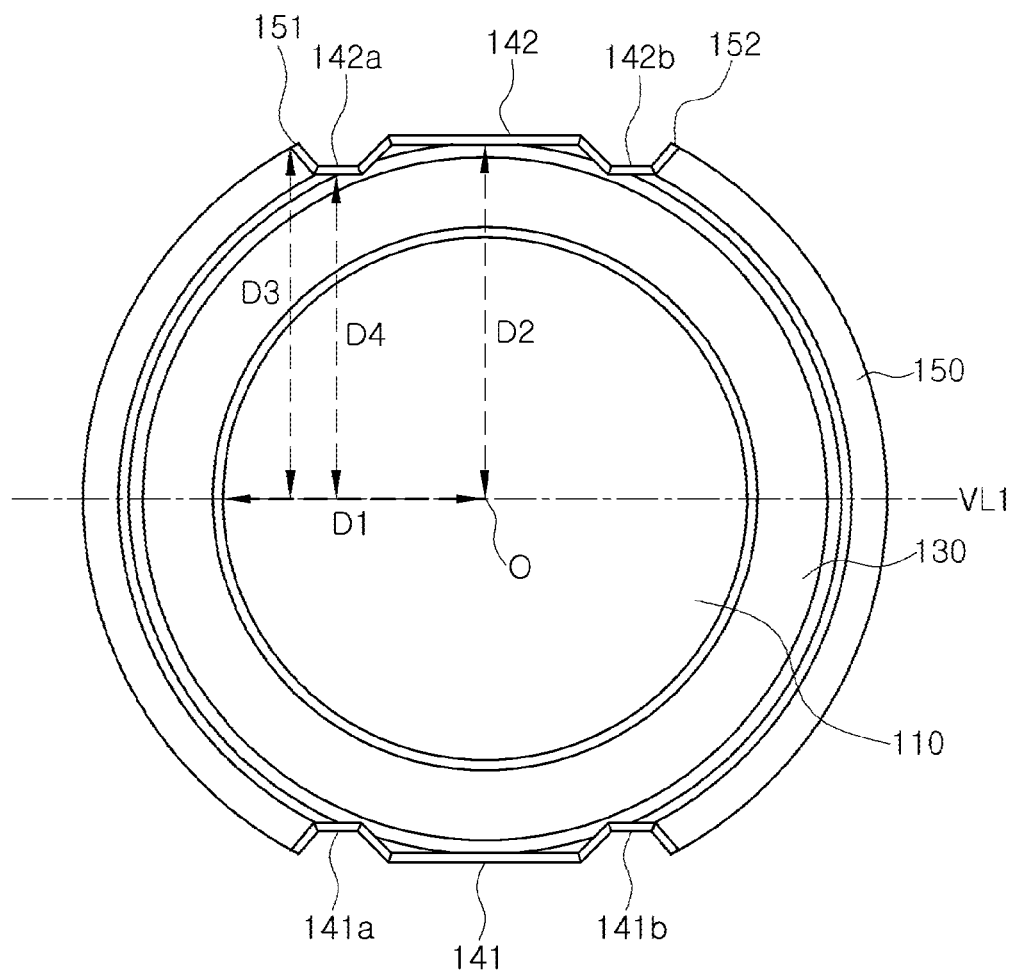

FIG. 9 is a plan view illustrating a lens of a lens assembly according to an example.

Referring to FIG. 9, the first di-cut portion 141 and the second di-cut portion 142 may be formed on the flange portion 130 of the lens 100.

For example, the first di-cut portion 141 may be formed on one side surface of the flange portion 130, and the second di-cut portion 142 may be formed on the other side surface of the flange portion 130. One side surface of the flange portion 130 and the other side surface thereof may be surfaces opposing each other. The arc portions 150 connecting the first di-cut portion 141 and the second di-cut portion 142 to each other may be formed on the flange portion 130.

The shortest distance D2 between the first reference line VL1 and the di-cut portions 140 (the second di-cut portion 142 in FIG. 9) may be smaller than or equal to the shortest distance D3 between the first reference line VL1 and the end 151 of one side of the arc portions 150.

The shortest distance D2 between the first reference line VL1 and the di-cut portions 140 (the second di-cut portion 142 in FIG. 9) may be greater than or equal to the maximum radius D1 of the optical portion 110 of the lens 100. Although D2 is illustrated to be greater than D1 in FIG. 9, D2 may be equal to D1.

Evasion portions may be formed on the flange portion 130. For example, a 1-1-th evasion portion 141a and a 1-2-th evasion portion 141b may be formed between the first di-cut portion 141 and the arc portions 150, and a 2-1-th evasion portion 142a and a 2-2-th evasion portion 142b may be formed between the second di-cut portion 142 and the arc portions 150.

The 1-1-th evasion portion 141a, the 1-2-th evasion portion 141b, the 2-1-th evasion portion 142a, and the 2-2-th evasion portion 142b may have a shape that is depressed inwardly from the flange portion 130.

The 1-1-th evasion portion 141a, the 1-2-th evasion portion 141b, the 2-1-th evasion portion 142a, and the 2-2-th evasion portion 142b may be positioned to be closer to the optical axis O than the opposite ends 151 and 152 of the arc portions 150.

The shortest distance D2 between the first reference line VL1 and the di-cut portions 140 (the second di-cut portion 142 in FIG. 9) may be greater than the shortest distance D4 between the first reference line VL1 and the evasion portions (the 2-1-th evasion portion 142a in FIG. 9).

According to the examples, the lens assembly may reduce a size of the lens assembly while securing the performance of the lens assembly, and prevent the occurrence of tilting when the lens barrel and the lens are assembled.

According to the examples, a portable electronic device may refer to a portable electronic device such as a mobile communication terminal, a smartphone, a tablet PC, or the like.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
a lens comprising an optical portion configured to refract light and a flange portion extended along a periphery of at least a portion of the optical portion; and
a lens barrel configured to accommodate the lens,
wherein the flange portion has a non-circular shape,
the flange portion comprises a first di-cut portion on a first side surface of the flange portion and a second di-cut portion on a second side surface of the flange portion, and arc portions connecting the first di-cut portion and the second di-cut portion, a first distance between the first di-cut portion and an optical axis of the lens and a second distance between the second di-cut portion and the optical axis of the lens are smaller than a distance between respective opposite ends of the arc portions and the optical axis, and when a straight line passing through the optical axis of the lens and extending to be parallel to the first di-cut portion and the second di-cut portion is a first reference line, a shortest distance between the first reference line and any one of the first di-cut portion and the second di-cut portion is smaller than a shortest distance between the first reference line and an end of one side of each of the first arc portion and the second arc portion.

2. The lens assembly of claim 1, wherein the first di-cut portion and the second di-cut portion are not in contact with the lens barrel, and the arc portions are in contact with the lens barrel.

3. The lens assembly of claim 1, wherein the shortest distance between the first reference line and any one of the first di-cut portion and the second di-cut portion is smaller than a maximum radius of the optical portion.

4. The lens assembly of claim 1, wherein the shortest distance between the first reference line and any one of the first di-cut portion and the second di-cut portion is greater than or equal to a maximum radius of the optical portion.

5. The lens assembly of claim 1, wherein the optical portion has a non-circular shape, the first di-cut portion extends along the first side surface of the flange portion and a first side surface of the optical portion, and the second di-cut portion extends along the second side surface of the flange portion and a second side surface of the optical portion.

6. The lens assembly of claim 1, wherein the first di-cut portion and the second di-cut portion each comprise a plane.

7. The lens assembly of claim 1, further comprising a second lens configured to be accommodated in the lens barrel, wherein the second lens has a different shape than the lens.

8. The lens assembly of claim 7, wherein the lens is disposed closer to an image sensor than the second lens.

9. A lens assembly comprising:

a lens; and a lens barrel configured to accommodate the lens, wherein the lens comprises a first di-cut portion on a first side surface of the lens, a second di-cut portion on a second side surface of the lens opposing the first side surface, a first arc portion connecting first ends of the first di-cut portion and the second di-cut portion, and a second arc portion connecting second ends of the first di-cut portion and the second di-cut portion, when a straight line passing through the optical axis of the lens and extending to be parallel to the first di-cut portion and the second di-cut portion is a first reference line, a shortest distance between the first reference line and any one of the first di-cut portion and the second di-cut portion is smaller than a shortest distance between the first reference line and an end of one side of each of the first arc portion and the second arc portion, and the first di-cut portion and the second di-cut portion are spaced apart from an inner surface of the lens barrel in a direction perpendicular to the optical axis of the lens.

10. The lens assembly of claim 9, wherein the lens barrel comprises a third di-cut portion corresponding to the first di-cut portion, a fourth di-cut portion corresponding to the second di-cut portion, a third arc portion corresponding to the first arc portion, and a fourth arc portion corresponding to the second arc portion.

11. The lens assembly of claim 10, wherein the third di-cut portion does not make contact with the first di-cut portion, the fourth di-cut portion does not make contact with the second di-cut portion, the third arc portion makes contact with the first arc portion, and the fourth arc portion makes contact with the second arc portion.

12. A camera module, comprising:

the lens assembly of claim 9;

a housing configured to accommodate the lens assembly; and an image sensor module configured to convert light incident through the lens assembly into an electrical signal.

* * * * *